United States Patent [19]

Yu

[11] Patent Number: 4,533,720
[45] Date of Patent: Aug. 6, 1985

[54] POLYARYLATE FORMATION BY ESTER INTERCHANGE REACTION USING γ-GAMMA LACTONES AS DILUENT

[75] Inventor: Michael C. Yu, Bartlesville, Okla.

[73] Assignee: Phillips Petroleum Company, Bartlesville, Okla.

[21] Appl. No.: 531,788

[22] Filed: Sep. 13, 1983

[51] Int. Cl.$^3$ .............................................. C08G 63/28
[52] U.S. Cl. ..................... 528/125; 528/126; 528/128; 528/173; 528/176; 528/179; 528/180; 528/181; 528/182; 528/190; 528/191; 528/193; 528/194; 528/271
[58] Field of Search ............... 528/125, 126, 128, 173, 528/176, 179–182, 190, 191, 193, 194, 271

[56] References Cited

U.S. PATENT DOCUMENTS

| | | | |
|---|---|---|---|
| 2,595,343 | 5/1952 | Drewitt | 528/179 |
| 3,160,602 | 12/1964 | Kantor | 528/179 |
| 3,234,168 | 2/1966 | Hare | 528/179 |
| 3,309,334 | 3/1967 | Holub | 528/176 |
| 3,444,131 | 5/1969 | Rosenbrock | 528/206 |
| 3,684,766 | 8/1972 | Jackson et al. | 528/176 |
| 3,780,148 | 12/1973 | Jackson et al. | 264/141 |
| 3,824,213 | 7/1974 | Stackman | 528/191 |
| 3,933,713 | 1/1976 | Sokolov | 528/179 |
| 3,948,856 | 4/1976 | Stackman | 528/191 |
| 3,972,852 | 8/1976 | Inata et al. | 528/176 |
| 4,064,108 | 12/1977 | Inata et al. | 528/193 |
| 4,075,173 | 2/1978 | Maruyama et al. | 528/193 |
| 4,281,099 | 7/1981 | Maresca | 528/176 |
| 4,294,956 | 10/1981 | Berger et al. | 528/125 |
| 4,294,957 | 10/1981 | Berger et al. | 528/125 |
| 4,314,051 | 2/1982 | Berger et al. | 528/125 |
| 4,321,355 | 3/1982 | Maresca et al. | 528/179 |
| 4,374,239 | 2/1983 | Berger et al. | 528/176 |
| 4,415,721 | 11/1983 | Kosanovich et al. | 528/176 |
| 4,439,586 | 3/1984 | Kawakami et al. | 528/173 |
| 4,485,230 | 11/1984 | Yu | 528/125 |

FOREIGN PATENT DOCUMENTS 0035269  9/1981  European Pat. Off. ............ 528/179

OTHER PUBLICATIONS

Bier, G., "Polyarylates (Polyesters from Aromatic Dicarboxylic Acids and Bisphenols)", *Polymer,* 15, (Aug. 1974), pp. 527–535.

Eareckson, W. M., "Interfacial Polycondensation. X. Polyphenyl Esters", *Journal of Polymer Science,* vol. XL, pp. 399–406, (1959).

Stackman, R. W., "Preparation of Aromatic Polyesters of Hindered Phenols by Acid Interchange Polycondensation. 1. Solvent Effects", *Ind. Eng. Chem. Prod. Res. Dev.,* 20, pp. 336–338, (1981).

*Primary Examiner*—Lester L. Lee
*Attorney, Agent, or Firm*—Lyell H. Carver

[57] ABSTRACT

In a process for preparing aromatic polyesters (polyarylates) by heating a bisphenol (e.g., Bisphenol-A), at least one dicarboxylic acid (e.g., terephthalic acid and isophthalic acid) and acetic anhydride, a gamma-butyrolactone, such as gamma-butyrolactone, is employed a diluent, reducing sublimation of reactants, and resulting in higher molecular weight of the polymer.

37 Claims, No Drawings

POLYARYLATE FORMATION BY ESTER INTERCHANGE REACTION USING γ- GAMMA LACTONES AS DILUENT

FIELD OF THE INVENTION

The invention pertains to a method for preparing aromatic polyesters (polyarylates). In a further aspect, the invention relates to aromatic polyesters with suitable inherent viscosity and good color.

BACKGROUND OF THE INVENTION

Polyarylates (aromatic polyesters) can be made by reacting an aromatic diacid with a diacetate of bisphenol, generally employing a two-stage reaction process in which a bisphenol is reacted with an acid or anhydride, such as acetic acid or acetic anhydride, followed by reaction of the resulting aliphatic carboxylic acid ester of the bisphenol with an aromatic diacid.

Problems persist in producing polyesters. Sublimation of reagents with losses of reagents out of the reaction vessel and/or deposition of reagents or of oligomers on reactor heads or in pipes, upsets the reaction stoichiometry and results in products of erratic inherent viscosity (I.V.), insufficient final molecular weight, discolored products, and other facets detracting from the commercial usefulness of the polymers.

A variety of solvents have been suggested in the prior art to assist in use of catalysts, or to reduce sublimation of reactants, and the like. Among these have been sulfolane, diphenyl acetone, benzophenone, N-methyl pyrrolidone, hexamethyl phosphoramide, benzonitrile, diethyl ether, triethylene glycol, diphenyl ether; cycloaliphatic, substituted aromatic compounds containing a benzylic and/or a tertiary hydrogen, such as diisopropylbenzene; biphenyl; and sulfones.

Nevertheless, still needed is a simple, effective, convenient, process to produce polyarylates, with little or no sublimation of reagents, and result in a product of good moldability, consistent suitable high inherent viscosity, and low color. Accordingly, such is the object of my invention.

BRIEF DESCRIPTION OF THE INVENTION

I have discovered an effective process for preparing good quality aromatic polyesters (polyarylates) from a bisphenol, an aromatic diacid, in admixture with a carboxylic acid anhydride, by conducting the reaction in the further presence of a γ-lactone as diluent.

My process employing the γ-lactone has as an object to substantially avoid or prevent problems otherwise associated with sublimation of reactants. It is a further object of my invention to produce polyarylates of generally consistently high I.V. and molecular weight ranges suitable for molding purposes. My preferred products are substantially non-crystalline, light-colored, tough, polyarylate polymers.

DETAILED DESCRIPTION OF THE INVENTION

Bisphenols

Bisphenols for use in the process of my invention can be represented by the structural formula:

HO—Ar—OH wherein Ar is a divalent aromatic unit. Examples of such divalent aromatic units Ar include:

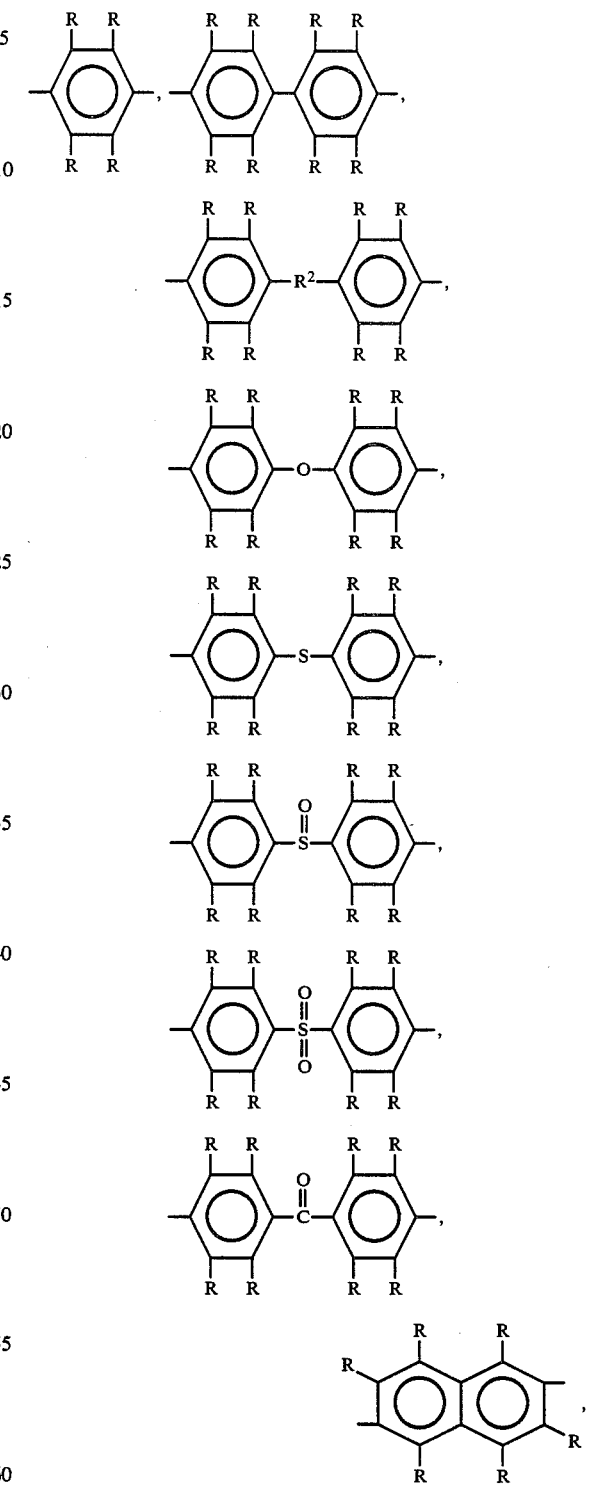

and the like. In the above formulae, each R can be the same or different, and each is individually selected from and represents H or a alkyl or cycloalkyl group of 1 to 8 carbon atoms per group, presently preferably H or the methyl group. $R^2$ is an alkylene or alkylidene radical having 1 to 8 carbon atoms, such as —$CH_2$—, —$CH_2$—$CH_2$—, —$CH(CH_3)$—, —$C(CH_3)_2$—, and the like.

Examples of bisphenols include:
hydroquinone,
resorcinol,
bis(4-hydroxyphenyl)methane,
1,1-bis(4-hydroxyphenyl)ethane,
1,2-bis(4-hydroxyphenyl)ethane,
2,2-bis(4-hydroxyphenyl)propane (Bisphenol A),
2,2-bis(2,6-dimethyl-4-hydroxyphenyl)propane,
2,2-bis(2,4-dioctyl-4-hydroxyphenyl)propane,
2,2-bis(2-t-butyl-4-hydroxyphenyl)pentane,
3,3-bis(2-isoamyl-4-hydroxyphenyl)heptane,
2,4-bis(2-isoamyl-4-hydroxyphenyl)heptane,
bis(4-hydroxyphenyl) ether,
bis(4-hydroxyphenyl) sulfide,
bis(4-hydroxyphenyl) sulfoxide
bis(4-hydroxyphenyl) sulfone,
bis(4-hydroxybenzophenone),
2,6-dihydroxynaphthalene, and mixtures thereof.

The presently preferred bisphenol is Bisphenol-A.

Diacids

Diacids employable in the process of my invention are the aromatic dicarboxylic acids. These include such as the presently preferred terephthalic acid and isophthalic acid, and mixtures thereof, as well as naphthalene dicarboxylic acids, and alkyl-substituted homologs of such dicarboxylic acids wherein the alkyl group contains 1 to 4 carbon atoms.

Mixtures of any ratio of isophthalic acid and terephthalic acids can be used. In these mixtures, the isophthalic acid:terephthalic acid mole or weight ratio can range from such as about 5:5 to 5:95. Preferably the ratio in such a mixture is in the range of about 90:10 to 30:70 for substantially amorphous properties, with a presently more preferred ratio of about 70:30 to 30:70 to produce the much preferred non-crystalline polyarylates; outside of the preferred range, crystalline characteristics of the resulting polyarylates become predominant as is apparent by their non-transparent appearance and/or by results of differential scanning calorimetry.

Other suitable and typical aromatic diacids include those mentioned and:
5-methylisophthalic acid,
2-methylisophthalic acid,
2-methyl-5-ethylisophthalic acid,
2-methylterephthalic acid,
2,6-dimethylterephthalic acid,
2-propylterephthalic acid,
2,6-naphthalene dicarboxylic acid, and mixtures thereof. Optionally, hydroxyaromatic monocarboxylic acids, such as m- or p-hydroxybenzoic acid, can be used in part, such as in a mole ratio relative to the diacid of about 1:100 to 1:2, preferably about 1:100 to 1:10, to vary the properties of the product.

Acid Anhydride

The acid anhydride employed is derived from a hydrocarbon organic dicarboxylic acid, preferably of 2 to 8 carbon atoms per molecule. The presently preferred acid anhydride is acetic anhydride for convenience and availability. Other useful acid anhydrides include such as propionic anhydride, butyric anhydride, valeric anhydride, caproic anhydride, and caprylic anhydride. Mixtures can be employed.

The anhydride(s) used preferably should be normally liquid, or, if normally solid, should have a melting point not exceeding about 40° C. so as to be liquid under convenient reaction temperatures.

Lactones From Gamma-Hydroxy Acids

The lactones which I have found to be surprisingly efficient diluents according to my invention are the γ-lactones. The γ-lactones do not polymerize under the reaction conditions employed. The γ-lactones can be represented by the general structure:

In the above formula, each $R^3$ is individually selected from and represents hydrogen, halogen, or an alkyl, cycloalkyl, alkenyl, cycloalkenyl, or aryl radical, or combinations thereof. The halogen can be chlorine or bromine.

Typically, the total number of carbon atoms in each of the $R^3$ substituents when they are hydrocarbyl in nature is in the range of 1 to 12 carbon atoms.

The γ-lactones employed should be normally liquid or have a melting point below about 50° C. so as to remain liquid when distilled under reaction conditions with by-product carboxylic acids.

Non-limiting examples of suitable γ-lactones include γ-butyrolactone, α-bromo-γ-butyrolactone, α-chloro-γ-valerolactone, γ-valerolactone, γ-(n-pentyl)-γ-butyrolactone, γ-(n-octyl)-γ-butyrolactone, γ-methyl-γ-valerolactone, γ-phenyl-γ-valerolactone, γ-caprolactone, β-ethyl-γ-caprolactone, α-methyl-γ-butyrolactone, β-ethyl-γ-valerolactone, γ-isopropylidene-γ-butyrolactone, and the like. Mixture of γ-lactones can be employed.

Reaction Conditions

Summary

In accordance with my invention, at least one bisphenol, at least one aromatic diacid, at least one acid anhydride, and at least one γ-lactone, are admixed together to form a reaction admixture. The reaction admixture is heated under reaction conditions to form a prepolymer, which then is polycondensed to the desired polymer.

In general, the reaction proceeds in programmed sequence of five phases:
(1) heating the reactants and diluent at a first moderately elevated temperature over a first suitable time interval, while employing an inert purge;
(2) holding the reactants substantially thereat for a second time interval;
(3) gradually elevating the temperature of the reaction admixture to a higher second temperature over a third suitable time interval while maintaining a flow of inert gas into and through the reactants and solvent to assist in removing volatiles;
(4) reducing the pressure of the reaction admixture gradually during a fourth time interval, preferably of at least about 50 to 90 minutes, to a vacuum condition while maintaining the higher second temperature;
(5) heating the reaction admixture at substantially the higher second temperature while maintaining the vacuum conditions for a suitable fifth time interval.

Reactant and Diluent Ratios

The molar ratio of bisphenol:aromatic diacid(s) should be such as to avoid large excesses of either reactant or diluent, though an excess of the bisphenol generally is considered less desirable. The presently preferred molar ratio of bisphenol:aromatic diacid(s) should be in the range of about 0.8:1 to 1.2:1, presently more preferably very close to stoichiometric, about 0.95:1 to 1:05:1 mole ratio.

Further employed is the hydrocarbon organic acid anhydride. The amount employed can range widely as convenient. Presently suggested is a molar ratio of anhydride:aromatic diacid in the range of about 1:1 to 4:1, preferably about 2:1 to 2.3:1.

The weight ratio of $\gamma$-lactone diluent to total theoretical amount of polymer made can range widely as can be as convenient. Presently suggested is a range of about 1:100 to 2:1, preferably about 1:30 to 1:2, more preferably about 1:10 to 1:3 ratio of $\gamma$-lactone:theoretical polymer.

REACTION STEPS

First Step

In the first reaction step, the reactants and diluent as a reaction admixture are placed in a reactor means which is filled with an inert gas blanket.

The reaction admixture is heated up to a first reaction temperature in the range of about 110° to 180° C., preferably about 130° to 150° C., with an inert gas atmosphere purge, over a first heating time interval of about 0.5 to 3 hours, preferably about 1 to 2 hours.

The inert gas can be selected from the presently preferred nitrogen, as well as from such as helium, argon, and neon.

Second Step

Then the reaction admixture is maintained at substantially the first reaction temperature for a second further time of about 1 to 3, preferably about 1.2 to 1.7 hours.

Third Step

In the third step, the temperature of the reaction admixture is gradually raised to a higher second reaction temperature, in the range of about 250° C. to 350° C., preferably about 280° C. to 320° C., accomplishing this gradual temperature elevation over a third time interval of about 1 to 6 hours, presently preferred about 3 to 4 hours.

Optionally, the first and second steps can be omitted if a preformed bisphenol diester is first charged to the reactor rather than the bisphenol plus anhydride: The mixture of the bisphenol diester of an aromatic diacid plus the $\gamma$-lactone diluent then can be used directly in the third step.

Fourth Step

Thereafter, the pressure on the reaction admixture is gradually reduced to a vacuum condition of about 1 to 50 mm Hg over a fourth time interval of about 0.5 to 3 hours, preferably to about 1 to 30 mm Hg, preferably over about 0.8 to 1.5 hours, all while maintaining substantially the aforesaid second reaction temperature. Diluent, carboxylic acid, water, and any excess reactants are removed by evaporation during this step.

A prepolymer is formed in the initial sequence of three steps. This relatively low molecular weight prepolymer preferably has an inherent viscosity (I.V.) of about 0.2 to 0.4.

Fifth Step

The prepolymer then is maintained at substantially the second reaction temperature under substantially the vacuum condition for a fifth reaction time interval of about 1 to 5 hours, preferably about 1.5 to 3 hours, to permit the prepolymer to attain a higher I.V., preferably an I.V. of about 0.6 to 1.1. This step can be carried out in a evacuatable vented screw extruder.

Product Recovery

The prepolymer obtained in the Third Step generally is extruded into a second reactor, while still at elevated temperature, through an exit line of the reactor either by mechanical means such as a screw extruder or by applying a gas pressure, e.g., a nitrogen pressure of about 30 to 100 psi, preferably 50 to 80 psi. The final polymer prepared in the Fourth Step is preferably expelled from the second reactor by means of a mechanical extruding device such as a single or twin screw venting extruder.

EXAMPLES

Examples are provided in an effort to assist one skilled in the art to a further understanding of the invention, and yet not be unduly limitative of the reasonable scope of the invention. The particular reactants, conditions, ratios, and the like, are all intended to be illustrative of my invention, and not limitative of the reasonable and suitable scope thereof.

Preferred General Procedure

In the runs for substantially non-crystalline polyarylate syntheses, 342.4 grams (1.5 moles) of Bisphenol-A (UHP-grade; supplied by Union Carbide Corp., Danbury, Conn.), 124.6 grams (0.75 mole) of terephthalic acid (fiber grade; supplied by Amoco Chem. Corp., Chicago, Ill.), 124.6 grams (0.75 mole) of isophthalic acid (ultra-pure grade IPA 220; supplied by Amoco Chem. Corp.), 336.9 grams (3.3 moles) of acetic anhydride (99+%; supplied by Aldrich Chem. Co., Milwaukee, Wisc.), and, when used, about 54 grams of $\gamma$-butyrolactone (supplied by Aldrich Chem. Co.) were charged to a 2-liter stirred autoclave reactor made of 316 stainless steel. The reactor was purged with nitrogen three times by applying a pressure of about 150 psi and subsequently venting it.

The reactor contents were heated to about 130° to 150° C. within about 30 minutes and held at that temperature for about 60 to 90 minutes, with a minimum amount of nitrogen purging.

The temperature then was gradually raised to about 300° C. within about 3 hours, while the reactor was vented to atmospheric pressure. A constant flow of nitrogen (0.4 SCFH) was introduced, and liquid distillate (about 370 ml) was collected in a graduated cylinder. Then the reactor was gradually evacuated to a final pressure of about 1 to 20 mm Hg, at about 300° C., during a period of about 1 hour.

The so-formed prepolymer (inherent viscosity: 0.2 to 0.4) then was extruded from the reactor through an exit line by applying about 60 psi $N_2$ pressure. No general statement can be made about the yield of the final (extruded) polymer in continuous runs due to variations caused by shape of reactor, size of extrusion path, shape and size of agitator, and the like. It is believed that the polymer yield is close to the theoretical yield.

A portion (about 8 grams) of the solid prepolymer was then placed in a glass tube (diameter of 2 inches, 6 inches long), which was heated at about 150° C. for about 1 hour, then at about 300° C. for about 2 hours, under vacuum conditions, to obtain the final polymer having an inherent viscosity of about 0.7 to 1.1.

EXAMPLE I

The general procedures described above were employed. The runs of this example illustrate the effects of γ-butyrolactone on the amount of sublimate and on the molecular weight (inherent viscosity) of the final polymer. Control Runs 1 to 4 were carried out without γ-butyrolactone diluent. Inventive Runs 5 to 12 used essentially the same polymerization procedure, but with butyrolactone also present in the reactor. Results are summarized in Table I:

TABLE I

| Run | Amount of Butyrolactone PHP[1] | Amount of Sublimate (grams) | IV[2] of Prepolymer | IV[2] of Final Polymer |
|---|---|---|---|---|
| 1 (Control) | 0 | 0.96 | —[3] | 0.61 |
| 2 (Control) | 0 | 9.3 | —[3] | 0.60 |
| 3 (Control) | 0 | 8.5 | —[3] | 0.59 |
| 4 (Control) | 0 | 6.5 | —[3] | 0.68 |
| 5 (Invention) | 10 | 0.04 | 0.26 | 1.03 |
| 6 (Invention) | 10 | 0.50 | 0.28 | 0.79 |
| 7 (Invention) | 10 | 0.30 | 0.23 | 0.59 |
| 8 (Invention) | 10 | 0.05 | 0.28 | 1.07 |
| 9 (Invention) | 10 | 0.20 | 0.27 | 1.07 |
| 10 (Invention) | 28 | 0 | —[3] | 0.75 |
| 11 (Invention) | 28 | 0 | —[3] | 0.90 |
| 12 (Invention)[4] | 20 | —[3] | 0.38 | 0.95 |

[1]parts by weight of diluent per 100 parts by weight of theoretical amount of polymer (100% yield).
[2]inherent viscosity = $\frac{\ln(\text{solution flow time:solvent flow time})}{\text{polymer concentration (g/100 cc)}}$; determined at 30° C., using solutions of 0.5 grams of polymer dissolved in 100 cc of syn-tetrachloroethane/phenol (40:60 weight ratio), employing a #2 viscometer.
[3]not determined.
[4]carried out in a 5 gallon reactor with 10 moles BPA, 5 moles each of TPA and IPA, and 22 moles of AA.

The data in Table I demonstrate that in the presence of butyrolactone that the polyarylate reaction (of Bisphenol-A, acetic anhydride, terephthalic and isophthalic acids, at essentially the same operating conditions in all runs) had at least three beneficial effects: less sublimate, consistent prepolymer IV, and higher final polymer IV. Minor variations in IV were apparently due to slightly differing conditions in the solid state of polymerization. No melting points of the preferred amorphous polymers of this invention were detected by differential scanning calorimetry (DSC).

EXAMPLE II

In the runs of this example the effects of butyrolactone as a diluent in the polyarylate reaction, made essentially in accordance with the general procedure described above, are compared to results obtained in runs using other diluents. Table II summarizes the results:

TABLE II

| Run | Solvent | Sublimate | Color of Polymer |
|---|---|---|---|
| 13 | Dimethyl Phthalate | much | quite dark |
| 14 | Tributyl Phosphate | little | dark |
| 15 | Nitrobenzene | some | dark |
| 16 | Trichlorobenzene | much | amber |
| 17 | N—methylpyrrolidone | some | dark |
| 18 | Biphenyl + Diphenyl ether | little | — |

TABLE II-continued

| Run | Solvent | Sublimate | Color of Polymer |
|---|---|---|---|
| 19 | Diphenylether | some | — |
| 20 | Butyrolactone | none | light amber |

The results shown above, the qualitative screening tests, identify butyrolactone as being more effective in reducing sublimation during polycondensation than other diluents, such as biphenyl and diphenyl ether.

EXAMPLE III

In this Example, the preparations of two presently less preferred substantially crystalline, non-transparent polyarylates of BPA are described. The polymerization procedures were essentially the same as the Preferred General Procedure, with the exception that different molar ratios of TPA:IPA were employed.

Run 21: employed 100% IPA; and 0% TPA. IV of the prepolymer: 0.16; IV of the final polymer: 0.37; prepolymer partially crystallized out.

Run 22: employed a molar ratio of TPA:IPA of 8:2; prepolymer appeared crystalline; IV of final polymer: 0.71; final polymer was prepared from prepolymer by solid state polymerization under non-vacuum conditions.

The disclosure, including data, has illustrated the value and effectiveness of my invention. The examples, the knowledge and background of the field of the invention and the general principles of chemistry and of other applicable sciences have formed the bases from which the broad descriptions of my invention including the ranges of conditions and the generic groups of operant components have been developed, and formed the bases for my claims here appended.

I claim:

1. The process of preparing a polyarylate by the process conducted in steps comprising:
   (a) heating together under reaction conditions reagents comprising at least one bisphenol, at least one aromatic dicarboxylic acid, and at least one organic acid anhydride, together with at least one γ-lactone as diluent, up to a moderately elevated first temperature with an inert gas purge over a first time interval;
   (b) maintaining substantially said first temperature for a second time interval;
   (c) gradually elevating the temperature to a higher second temperature over a third time interval while maintaining a flow of inert gas;
   thereby forming a prepolymer, and
   (d) reducing the pressure gradually to vacuum conditions while maintaining said second temperature for a fourth time interval; and
   (e) substantially maintaining the higher second temperature while maintaining said vacuum conditions for a fifth time interval;
   thereby forming said polyarylate.

2. The process according to claim 1 wherein said γ-lactone is represented by

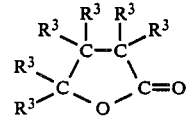

wherein each R³ is individually selected from the group consisting of a halogen which is chlorine or bromine, and a alkyl, cycloalkyl, alkenyl, cycloalkenyl, or aryl radical, or combinations thereof.

3. The process according to claim 2 wherein said γ-lactone is selected from the group consisting of γ-butyrolactone, α-bromo-γ-butyrolactone, α-chloro-γ-valerolactone, γ-valerolactone, γ-(n-pentyl)-γ-butyrolactone, γ-(n-octyl)-γ-butyrolactone, γ-methyl-γ-valerolactone, γ-phenyl-γ-valerolactone, γ-caprolactone, β-ethyl-γ-caprolactone, α-methyl-γ-butyrolactone, β-ethyl-γ-valerolactone, γ-isopropylidene-γ-butyrolactone, and mixtures.

4. The process of claim 3 wherein said γ-lactone is γ-butyrolactone.

5. The process of claim 1 wherein said bisphenol is represented by the formula:

HO—Ar—OH wherein Ar is a divalent aromatic unit.

6. The process of claim 5 wherein in said bisphenol, said Ar is selected from the group consisting of:

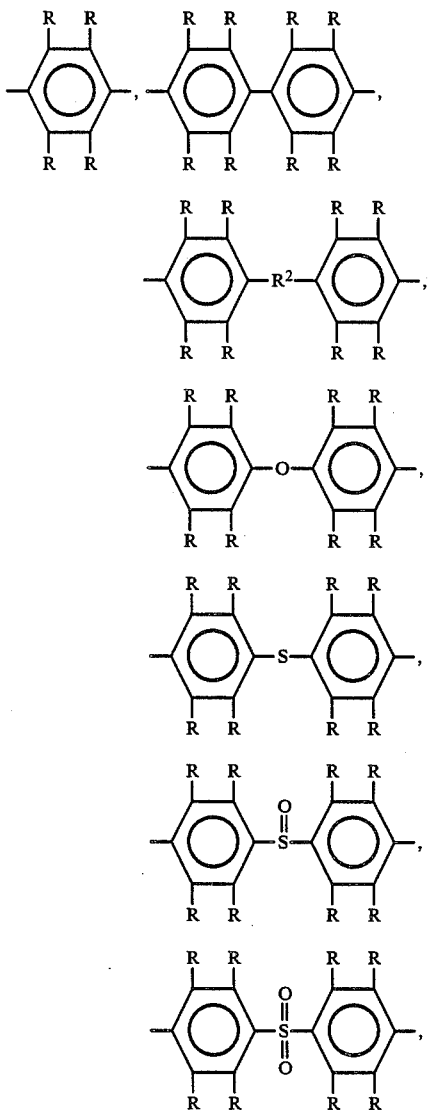

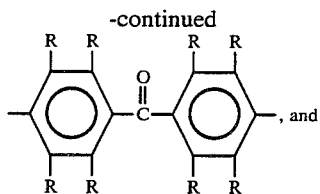

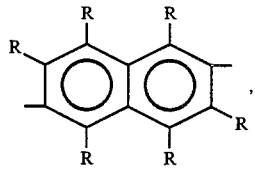

wherein each R can be the same or different, and each R represents H or alkyl or cycloalkyl group of 1 to 8 carbon atoms per group; and R² is an alkylene or alkylidene radical having 1 to 8 carbon atoms.

7. The process of claim 6 wherein said R is H or the methyl group; and R² is selected from the group consisting of —CH₂—, —CH₂—CH₂—, —CH(CH₃)—, and —C(CH₃)₂—.

8. The process of claim 6 wherein said bisphenol is selected from the group consisting of:
hydroquinone,
resorcinol,
bis(4-hydroxyphenyl)methane,
1,1-bis(4-hydroxyphenyl)ethane,
1,2-bis(4-hydroxyphenyl)ethane,
2,2-bis(4-hydroxyphenyl)propane,
2,2-bis(2,6-dimethyl-4-hydroxyphenyl)propane,
2,2-bis(2,4-dioctyl-4-hydroxyphenyl)propane,
2,2-bis(2-t-butyl-4-hydroxyphenyl)pentane,
3,3-bis(2-isoamyl-4-hydroxyphenyl)heptane,
2,4-bis(2-isoamyl-4-hydroxyphenyl)heptane,
bis(4-hydroxyphenyl) ether,
bis(4-hydroxyphenyl) sulfide,
bis(4-hydroxyphenyl) sulfoxide
bis(4-hydroxyphenyl) sulfone,
bis(4-hydroxybenzophenone),
2,6-dihydroxynaphthalene, and
mixtures thereof.

9. The process of claim 6 wherein said aromatic dicarboxylic acid is selected from the group consisting of terephthalic acid, isophthalic acid, naphthalene dicarboxylic acids, alkyl-substituted homologs of these carboxylic acids wherein the alkyl group contains 1 to 4 carbon atoms, and mixtures thereof.

10. The process of claim 9 wherein said aromatic dicarboxylic acid is selected from the group consisting of:
5-methylisophthalic acid,
2-methylisophthalic acid,
isophthalic acid,
terephthalic acid,
2-methyl-5-ethylisophthalic acid,
2-methylterephthalic acid,
2,6-dimethylterephthalic acid,
2-propylterephthalic acid,
2,6-naphthalene dicarboxylic acid, and mixtures thereof.

11. The process of claim 10 further employing at least one hydroxyaromatic monocarboxylic acid selected from the group consisting of m- and p-hydroxybenzoic acid in a mole ratio relative to the diacid in the range of about 1:100 to 1:2.

12. The process of claim 10 wherein said organic acid anhydride is derived from a hydrocarbon organic dicarboxylic acid of 2 to 8 carbon atoms; employing a mole ratio of bisphenol:aromtic diacid of about 0.8:1 to 1.2:1; and employing a molar ratio of anhydride:aromatic diacid of about 1:1 to 4:1.

13. The process of claim 12 wherein said acid anhydride is selected from the group consisting of acetic anhydride, propionic anhyride, butyric anhydride, valeric anhydride, caproic anhydride, caprylic anhydride, and mixtures thereof.

14. The process of claim 13 wherein said aromatic dicarboxylic acid is a mixture of isophthalic acid and terephthalic acids.

15. The process of claim 14 employing said isophthalic acid:terephthalic acid in a mole ratio of about 90:10 to 30:70.

16. The process of claim 15 wherein said bisphenol is Bisphenol-A, said acid anhydride is acetic anhydride, and said γ-lactone is butyrolactone.

17. The process of claim 1 wherein said:
(a) first temperature is about 110° C. to 180° C., said first time interval is about 0.5 to 3 hours;
(b) second time interval is about 1 to 3 hours;
(c) second temperature is about 250° C. to 350° C., and said third time interval is about 1 to 6 hours; thereby forming a prepolymer of an inherent viscosity of about 0.2 to 0.4;
(d) vacuum condition is about 1 to 50 mm Hg, and said fourth time interval is about 0.5 to 3 hours; and
(e) fifth time interval is about 1 to 5 hours; thereby forming a polyarylate polymer of inherent viscosity of about 0.6 to 1.1.

18. The process of claim 17 wherein said:
(a) first temperature is about 130° C. to 150° C., said first time interval is about 1 to 2 hours;
(b) second time interval is about 1.2 to 1.7 hours;
(c) second temperature is about 280° C. to 320° C., and said third time interval is about 3 to 4 hours; thereby forming a prepolymer of an inherent viscosity of about 0.2 to 0.4;
(d) vacuum condition is about 1 to 30 mm Hg, and said fourth time interval is about 0.8 to 1.5 hours; and
(e) fifth time interval is about 1.5 to 3 hours; thereby forming a polyarylate polymer of inherent viscosity of about 0.6 to 1.1.

19. The process of preparation of a polyarylate which comprises heating together reagents comprising at least one bisphenol diester of an aromatic dicarboxylic acid, at least one organic acid anhydride, and at least one γ-lactone as diluent conducted in steps comprising:
(a) heating said reagents and diluent to a temperature of about 250° C. to 350° C. under an inert gas purge over a time interval of about 1 to 6 hours,
(b) reducing the pressure gradually to vacuum conditions while maintaining said temperature for a time interval of about 0.5 to 3 hours; and
(c) substantially maintaining said temperature while maintaining said vacuum conditions for a time interval of about 1 to 5 hours.

20. The process according to claim 19 wherein said γ-lactone diluent is represented by

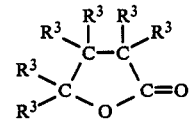

wherein each $R^3$ is individually selected from the group consisting of hydrogen, a halogen which is chlorine or bromine, and an alkyl, cycloalkyl, alkenyl, cycloalkenyl, or aryl radical, or combinations thereof.

21. The process according to claim 20 wherein said lactone diluent is selected from the group consisting of γ-butyrolactone, α-bromo-γ-butyrolactone, α-chloro-γ-valerolactone, γ-valerolactone, γ-(n-pentyl)-γ-butyrolactone, γ-(n-octyl)-γ-butyrolactone, γ-methyl-γ-valerolactone, γ-phenyl-γ-valerolactone, γ-caprolactone, β-ethyl-γ-caprolactone, α-methyl-γ-butyrolactone, β-ethyl-γ-valerolactone, γ-isopropylidene-γ-butyrolactone, and mixtures.

22. The process of claim 21 wherein said bisphenol in said diester is represented by the formula:

wherein Ar is a divalent aromatic unit, and is selected from the group consisting of:

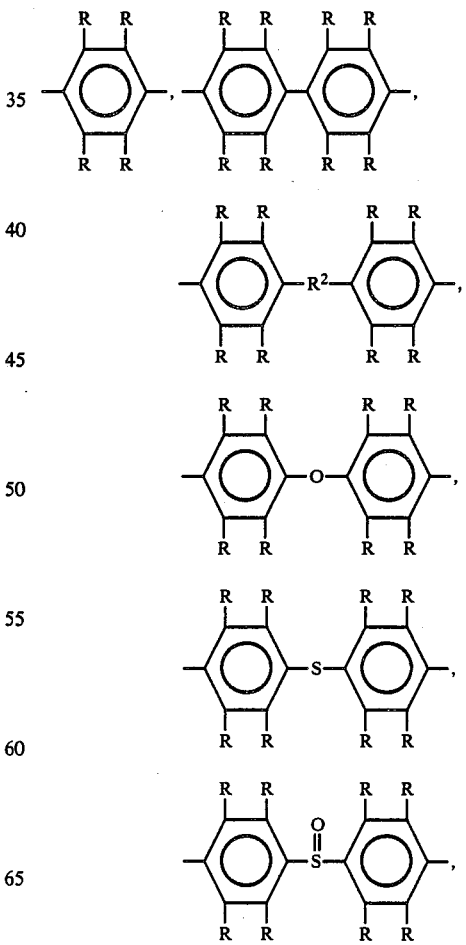

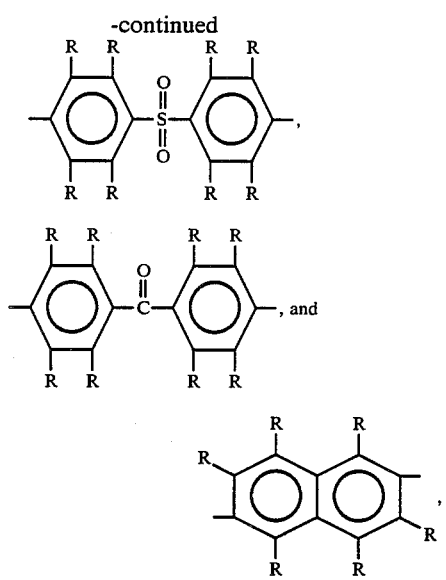

wherein each R can be the same or different and represents H or alkyl or cycloalkyl group of 1 to 8 carbon atoms per group; and R² is an alkylene or alkylidene radical having 1 to 8 carbon atoms.

23. The process of claim 22 wherein said R is H or the methyl group; and R² is selected from the group consisting of —CH₂—, —CH₂—CH₂—, —CH(CH₃)—, and —C(CH₃)₂—.

24. The process of claim 22 wherein said bisphenol in said diester is selected from the group consisting of:
hydroquinone,
resorcinol,
bis(4-hydroxyphenyl)methane,
1,1-bis(4-hydroxyphenyl)ethane,
1,2-bis(4-hydroxyphenyl)ethane,
2,2-bis(4-hydroxyphenyl)propane,
2,2-bis(2,6-dimethyl-4-hydroxyphenyl)propane,
2,2-bis(2,4-dioctyl-4-hydroxyphenyl)propane,
2,2-bis(2-t-butyl-4-hydroxyphenyl)pentane,
3,3-bis(2-isoamyl-4-hydroxyphenyl)heptane,
2,4-bis(2-isoamyl-4-hydroxyphenyl)heptane,
bis(4-(4-hydroxyphenyl) ether,
bis(4-hydroxyphenyl) sulfide,
bis(4-hydroxyphenyl) sulfoxide,
bis(4-hydroxyphenyl) sulfone,
bis(4-hydroxybenzophenone),
2,6-dihydroxynaphthalene, and mixtures thereof.

25. The process of claim 22 wherein said aromatic dicarboxylic acid of said diester is selected from the group consisting of terephthalic acid, isophthalic acid, naphthalene dicarboxylic acids, and alkyl-substituted homologs of these carboxylic acids wherein the alkyl group contains 1 to 4 carbon atoms, and mixtures thereof.

26. The process of claim 25 wherein said diester is prepared from an aromatic carboxylic acid selected from the group consisting of:
5-methylisophthalic acid,
2-methylisophthalic acid,
isophthalic acid,
terephthalic acid,
2-methyl-5-ethylisophthalic acid,
2-methylterephthalic acid,
2,6-dimethylterephthalic acid,
2-propylterephthalic acid,
2,6-naphthalene dicarboxylic acid, and mixtures thereof.

27. The process of claim 25 further employing at least one hydroxyaromatic monocarboxylic acids selected from the group consisting of m- and p-hydroxybenzoic acids, in a mole ratio relative to the equivalent diacid in the diester in the range of about 1:100 to 1:2.

28. The process of claim 26 wherein said organic acid anhydride is derived from a hydrocarbon organic dicarboxylic acid of 2 to 8 carbon atoms; and employing a molar ratio of anhydride:aromatic diacid in said diester of about 1:1 to 4:1.

29. The process of claim 28 wherein said acid anhydride is selected from the group consisting of acetic anhydride, propionic anhydride, butyric anhydride, valeric anhydride, caproic anhydride, caprylic anhydride, and mixtures thereof.

30. The process of claim 29 wherein said bisphenol diester of an aromatic dicarboxylic acid is a mixture of the diesters of isophthalic acid and terephthalic acids.

31. The process of claim 30 wherein said diester represents an isophthalic acid:terephthalic acid mole ratio of about 90:10 to 30:70.

32. The process of claim 31 wherein said bisphenol diester is a Bisphenol-A diester, said acid anhydride is acetic acid, and said γ-lactone diluent is butyrolactone.

33. The process of claim 19 wherein in said step:
(a) said temperature is about 280° C. to 320° C., said time interval is about 3 to 4 hours;
(b) said vacuum condition is about 1 to 50 mm Hg, and said time interval is about 0.8 to 1.5 hours; and
(c) said time interval is about 1.5 to 3 hours.

34. The process of claim 1 employing a weight ratio of said γ-lactone:polymer of about 1:100 to 2:1.

35. The process of claim 34 employing a weight ratio of said γ-lactone:polymer of about 1:30 to 2:1.

36. The process of claim 19 employing a weight ratio of said γ-lactone:polymer of about 1:100 to 2:1.

37. The process of claim 36 employing a weight ratio of said γ-lactone:polymer of about 1:30 to 2:1.

* * * * *